US008800882B2

(12) United States Patent
Huck et al.

(10) Patent No.: US 8,800,882 B2
(45) Date of Patent: Aug. 12, 2014

(54) DEVICE AND METHOD FOR OPERATING A DRIVE

(75) Inventors: Kai Huck, Wetter (DE); Jan Erik Bertram, Bochum (DE)

(73) Assignee: Grohe AG, Hemer (DE)

( * ) Notice: Subject to any disclaimer, the term of this patent is extended or adjusted under 35 U.S.C. 154(b) by 482 days.

(21) Appl. No.: 13/155,005

(22) Filed: Jun. 7, 2011

(65) Prior Publication Data

US 2011/0233291 A1 Sep. 29, 2011

Related U.S. Application Data

(63) Continuation of application No. PCT/EP2009/008573, filed on Dec. 2, 2009.

(30) Foreign Application Priority Data

Dec. 8, 2008 (DE) .......................... 10 2008 060 672

(51) Int. Cl.
  *G05D 23/13* (2006.01)
  *G05D 3/00* (2006.01)
  *H02P 7/00* (2006.01)

(52) U.S. Cl.
  CPC .............. *G05D 23/1393* (2013.01); *H02P 7/00* (2013.01); *H02P 2203/09* (2013.01); *G05B 2219/37171* (2013.01); *G05B 2219/41329* (2013.01)
  USPC ........................................ 236/12.12; 318/466

(58) Field of Classification Search
  USPC .................... 236/12.12; 318/400.23, 466, 565
  See application file for complete search history.

(56) References Cited

U.S. PATENT DOCUMENTS

| 5,132,602 | A | 7/1992 | Jorgensen et al. |
| 6,144,179 | A | 11/2000 | Kessler et al. |
| 6,408,881 | B2 | 6/2002 | Lorenzelli et al. |
| 6,839,653 | B2 * | 1/2005 | Gerlach ........................ 702/151 |
| 2003/0109974 | A1 * | 6/2003 | Ishihara .......................... 701/41 |
| 2004/0041034 | A1 * | 3/2004 | Kemp ......................... 236/12.12 |
| 2007/0052381 | A1 * | 3/2007 | Ueda et al. .................... 318/432 |
| 2009/0174354 | A1 | 7/2009 | Knezevic et al. |
| 2009/0314363 | A1 | 12/2009 | Schmidt |
| 2010/0228446 | A1 | 9/2010 | Schulter et al. |

FOREIGN PATENT DOCUMENTS

| DE | 35 27 906 A1 | 2/1987 |
| DE | 41 38 194 A1 | 5/1993 |
| DE | 197 29 238 C1 | 8/1998 |
| DE | 103 04 837 A1 | 8/2004 |

(Continued)

*Primary Examiner* — Marc Norman
(74) *Attorney, Agent, or Firm* — Muncy, Geissler, Olds & Lowe, P.C.

(57) ABSTRACT

A device and a method for operating a drive having a mechanically commutated electric motor, is provided, wherein a rotary position of the drive is determined by a circuit from a ripple of a motor current of the electric motor, wherein at least one correction value is determined for an error characteristic of the electric motor, wherein at least one correction value is determined for an error characteristic of the electric motor, in that the drive is moved to a reference position that can be sensed by means of a position sensor, in that the drive is moved from the reference position into a plurality of positions at a distance from the reference position and at least one position deviation is determined by the circuit, and in that the correction value is determined from the particular position deviation and stored.

11 Claims, 3 Drawing Sheets

(56) References Cited

FOREIGN PATENT DOCUMENTS

| DE | 600 06 928 T2 | 10/2004 |
| DE | 203 16 371 U1 | 1/2005 |
| DE | 10 2005 018 526 A1 | 10/2006 |
| DE | 10 2005 037 471 A1 | 2/2007 |
| DE | 10 2006 033 352 A1 | 1/2008 |
| EP | 1 333 150 A2 | 8/2003 |
| EP | 1 605 327 A2 | 12/2005 |

* cited by examiner

DEVICE AND METHOD FOR OPERATING A DRIVE

This nonprovisional application is a continuation of International Application No. PCT/EP2009/008573, which was filed on Dec. 2, 2009, and which claims priority to German Patent Application No. DE 10 2008 060 672.3, which was filed in Germany on Dec. 8, 2008, and which are both herein incorporated by reference.

BACKGROUND OF THE INVENTION

1. Field of the Invention

The present invention concerns a device and a method for operating a drive, in particular for a mixing valve for cold and hot water.

2. Description of the Background Art

Known from DE 35 27 906 A1 is a circuit arrangement for positioning a vehicle seat using the evaluation of periodic current fluctuations. Known from DE 10 2005 037 471 A1, which corresponds to US Publication No. US 20100228446, DE 197 29 238 C1, which corresponds to U.S. Pat. No. 6,144,179, and DE 10 2005 018 526 A1, which corresponds to US Patent No. US 20090174354, is a method for positioning or rotational speed measurement of a movable window in a motor vehicle.

Known from DE 10 2006 033 352 A1, which corresponds to US Publication No. US 20090314363, is a concealed sanitary fitting with a base body and an electrically operated mixing device. Known from DE 600 06 928 T2, which corresponds to U.S. Pat. No. 6,408,881, is a device for delivering and mixing water, in which the delivery is primarily controlled automatically by a sensor, which indicate the presence of a user. Known from EP 1 605 327 A2 is a sanitary thermostatic valve that has a thermostatic element in a housing for setting the desired temperature of the mixed water. The thermostatic element is acted upon by an electric linear actuator, which comprises a stepper motor with multiple stator windings and a rotor.

SUMMARY OF THE INVENTION

It is therefore an object of the invention to improve a method for operating a drive to the greatest extent possible.

Accordingly, a method is provided for operating a drive with a mechanically commutated electric motor. A mechanically commutated electric motor can have typically two brushes in a rotationally fixed arrangement and commutator segments moving with the rotation of the electric motor and electrically contacts the brushes.

A rotational position of the drive is ascertained by a circuit from a ripple of a motor current of the electric motor. Such a current ripple can also be referred to as a ripple current. Counting the waves of the current ripple is also called the ripple count.

At least one correction value is ascertained for an error characteristic of the electric motor. The correction value is motor-specific and may depend on additional physical quantities.

To ascertain the correction value, the drive is first moved to a reference position that can be sensed by a position sensor. To this end, the circuit drives the electric motor. The electric motor can be controlled in such a manner that the reference position is detected by one or more signals of the position sensor.

To ascertain the correction value, the drive is moved, starting from the reference position, into multiple positions at different distances from the reference position. Preferably, the movement to the positions at different distances takes place sequentially.

After movement to the positions at different distances from the reference position, at least one position deviation is ascertained by the circuit. A position deviation in this context is the difference between a real actuation position of the drive, which can be ascertained at the reference position, and the position determined by evaluation of the current ripple.

The correction value is ascertained, in particular calculated, from the position deviation that has been determined, and is stored in a memory. Preferably, the correction values are used to correct the position ascertained by means of the ripple. In the case where the reference position sensed by means of the position sensor is passed, the position ascertained by means of the ripple is preferably normalized, and to this end is advantageously set to a predefined position value.

The invention also has the object of specifying a device that is improved to the greatest extent possible.

Accordingly, a device is provided that has a drive with a mechanically commutated electric motor. In contrast to electrically commutated electric motors (for example, synchronous motors), in the case of mechanical commutation the commutation is accomplished by the means that brushes sliding on the commutator segments of the electric motor form mechanically actuated switches in combination with the commutator segments.

The device has a circuit, which is advantageously programmable, to control the electric motor. In order to control the electric motor, the circuit is connected to the electric motor, for example via cables. For control, the circuit preferably has a power switch, such as a relay or semiconductor switch, for example, to switch the motor current. To generate the control signals for control, the circuit preferably has a computing unit, for example a microcontroller.

The circuit is designed to ascertain a rotational position of the drive from a ripple of a motor current through the electric motor. To this end, the circuit has a measurement device, in particular a shunt resistor and an analog-to-digital converter. To ascertain the rotational position, a number of detected waves of the ripple are preferably added to or subtracted from the current rotational position according to the direction of displacement. The circuit is preferably designed to add or subtract counted waves of the ripple of the motor current to or from the current position value. In this design, the counting of the waves represents a stepwise (incremental) increase or decrease in the rotational position by a fixed (angular) value.

In addition, the drive has a position sensor connected to the circuit. The position sensor is designed to sense at least one actuation position independent of the ripple of the motor current. A position sensor can also be referred to as a displacement (measurement) sensor. A transmitter is associated with the position sensor.

The circuit is designed to move the drive to a reference position that can be sensed by means of the position sensor, by controlling the electric motor. This can also be referred to as the reference travel or referencing. By means of the reference travel, the position ascertained by evaluating the waves of the ripple is normalized with respect to the reference position, for example is set to the position value "zero."

The circuit is designed to move the drive to multiple positions at different distances from the reference position, starting from the reference position. The circuit is designed to ascertain at least one position deviation from the movement to the positions at different distances from the reference position. Preferably, movement back to the reference position takes place thereafter.

The circuit has a memory. The circuit is designed to determine, in particular calculate, at least one correction value for an error characteristic of the electric motor from the ascertained position deviations, in particular by means of a computing unit. The correction value is stored in the memory, preferably in a nonvolatile manner.

The refinements described below relate to the device as well as to the method. Method features result here from functions of the circuit of the device. Functions of the device can be derived from method features.

According to an embodiment, provision is made for the drive to be moved in both directions of displacement starting from the reference position in order to determine at least two correction values. To this end, multiple positions at different distances from the reference position are provided, preferably on both sides of the reference position. For example, the positions at different distances from the reference position are arranged as mirror images with respect to the reference position.

In an embodiment, the electric motor can be driven by the circuit for a predetermined number of waves of the ripple of the motor current in order to move the drive to the multiple positions at distances from the reference position. Upon reaching the predetermined number of waves, the electric motor is preferably stopped and restarted to move to the next position. Upon reaching the last predetermined position, the drive is moved back to the reference position and a total deviation is determined by the position sensor.

According to an embodiment, several of the positions at distances from the reference position are equidistant from one another. Advantageously, the positions at distances from the reference position in a first direction of displacement are arranged at a first fixed spacing, for example 10 waves. Advantageously, the positions at distances from the reference position in a second direction of displacement are arranged at a second fixed spacing, for example 20 waves.

The electric motor can be stopped at each of the positions at distances from the reference position and is restarted thereafter.

The correction value can be calculated. In an embodiment, the correction value can be calculated by averaging position deviations. Advantageously, a total deviation is divided by a number of positions. In this design, it is preferred for one correction value to be calculated for each direction of displacement independently of each other.

The method can be used for controlling a mixing valve for cold water and hot water. According to an embodiment, a thermostat of the mixing valve for cold water and hot water can be positioned by means of the electric motor of the drive. Preferably, a mixed water temperature is controlled on the basis of the determined rotational position.

In an embodiment, the device can have a mixing valve for cold water and hot water with thermostatic regulation of the mixed water temperature. In this design, the mixing valve has a thermostat that is or can be mechanically coupled to the drive. The circuit here is designed to control the mixed water temperature based on the ascertained rotational position.

According to an embodiment, the transmitter and the position sensor are designed to produce a signal characteristic of a predetermined mixed water temperature. Preferably, the transmitter and the position sensor produce exactly one characteristic signal for exactly one mixed water temperature established by calibration.

In an embodiment, the position sensor can be designed as a switch. The switch can be a double-throw switch, a normally open switch, or a normally closed switch, for example. A momentary switch is also to be understood to be a switch here. Preferably, the transmitter is designed as a cam element, in particular moved on the output side of the drive. For example, the cam element is a camshaft, cam disk, or cam ring. The cams of the cam element are positioned to actuate the switch. Alternatively, the transmitter is advantageously a magnet and the position sensor is a Hall sensor. Alternatively, the position sensor is advantageously an optical sensor and the transmitter is an optical disk (perforated disk, slotted disk).

According to an embodiment, provision is made for the drive and the thermostat to be mechanically coupled in a removable manner. The mixing valve can have a coupling for mechanical coupling. A transmitter can be moved into the reference position to the position sensor in a reference travel by the drive before mechanical coupling of the drive and the thermostat. The correction values can be ascertained immediately thereafter and the drive is moved back to the reference position in this process. Moreover, the thermostat can be moved into a position for a predefined mixed water temperature. For example, the mixed water temperature is measured and the position of the thermostat is moved manually until a desired mixed water temperature is established. This accomplishes the result that the position of the thermostat is associated with the reference position of the transmitter after mechanical coupling.

The embodiments described above are especially advantageous both individually and in combination. In this regard, all variant refinements can be combined with one another. Some possible combinations are explained in the description of the exemplary embodiments. These possibilities for combinations of the variant refinements are not restrictive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
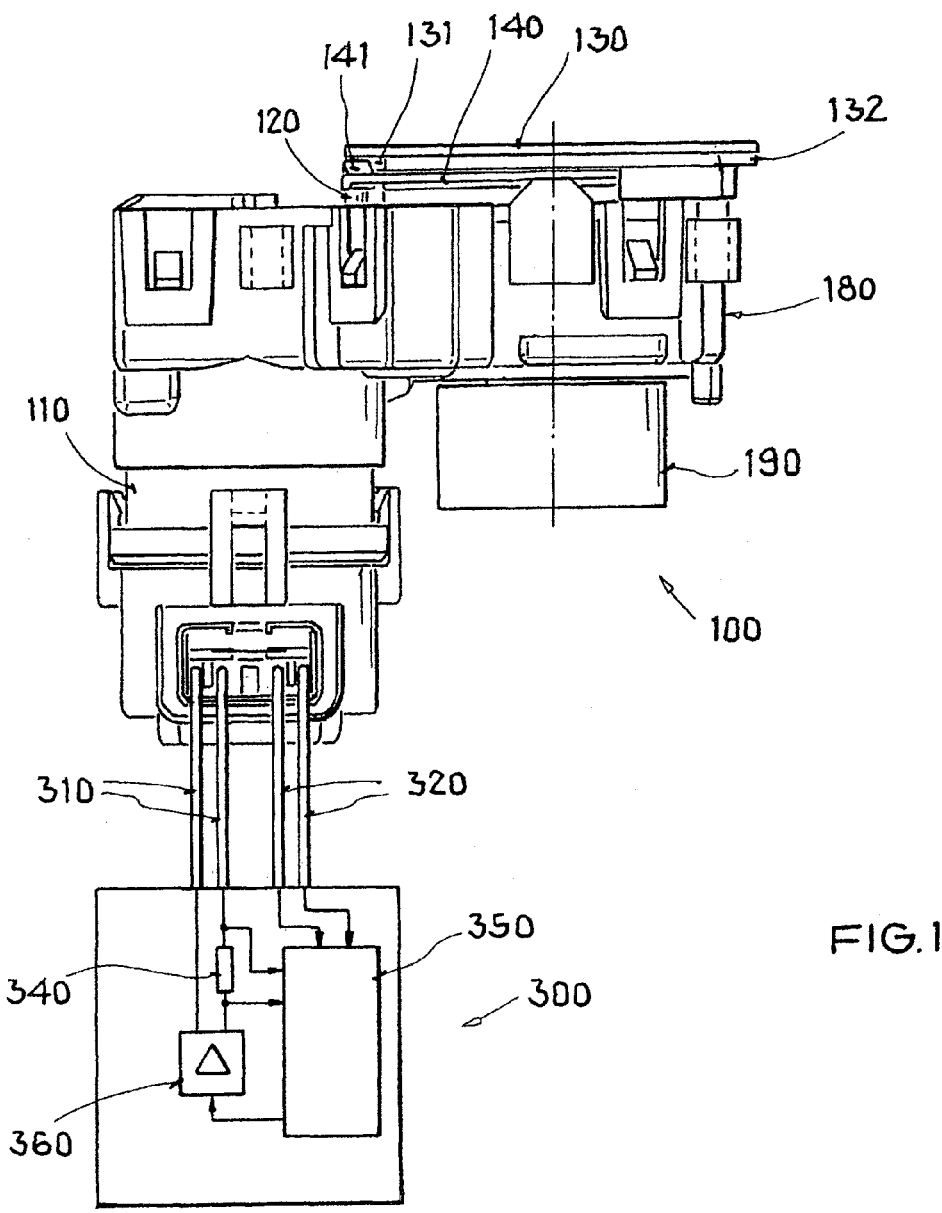
FIG. 1 shows a schematic view of a drive and a circuit.

In FIG. 1, a schematic view is shown of a drive 100 and a circuit 300 for a mixing valve. The drive 100 has a mechanically commutated electric motor 110, which acts on the coupling 190 through a transmission in a transmission housing 180. A cam ring 130 with cams 131 and 132 is attached to the coupling in a rotationally fixed manner. The cams 131, 132 of the cam ring 130 actuate a switch 120 through a transmission element 140. In this design, the push rod of the switch 120 is actuated by the means that a cam 131, 132 of the cam ring 130 presses an elastically mounted elevation 141 of the transmission element in the axial direction toward the switch 120 when passing over it. The switch 120 can be designed as a reversing switch, a normally closed switch, or a normally open switch, for example.

The cam ring 130 has a narrow cam 131 and a wide cam 132. Both cams 131, 132 have appropriate flanks that work together with the elastically mounted elevation 141 of the transmission element 140. The transmission element 140 is attached to the transmission housing 180 in a rotationally fixed manner, and is thus fixed in position relative to the switch 120. In contrast, the cam ring 130 rotates along with the output side so that the cams 131, 132 are displaced in a radial direction relative to the elevation 141 of the transmission element 140. The cam ring 130 also has a shaft with external teeth, permitting rotationally fixed coupling of the cam ring 130 to the coupling 190.

FIG. 1 also schematically shows a circuit 300 that is connected to the electric motor 110 of the drive 100 through cables 310. The circuit 300 is designed to control the electric motor 110. To this end, the circuit 300 has a power switch 360, for example a relay or a semiconductor switch, so that the electric motor 110 can be supplied with power through the cable 310. The circuit 300 has a measurement and control device 350, for example a microcontroller, by means of which the power switch 360 is controlled.

The circuit 300 is also designed to determine a rotational position of the drive 100 from a ripple of a motor current. To this end, the circuit 300 has, in a connection to the electric motor 110, a shunt 340 that is connected to a measurement input of the measurement and control device 350. The circuit 300 is designed to control the mixed water temperature by means of the rotational position that has been determined. For example, an input device (not shown) is provided, by means of which a mixed water temperature (for example, 35° C.) can be input to the measurement and control device 350. For example, pushbuttons or a rotary control (not shown) are provided for this purpose. In this design, the selected mixed water temperature is associated with a rotational position by the measurement and control device 350. The electric motor 110 is supplied with current by means of the power switch 360 for a rotational motion in the direction of the associated rotational position.

During the rotational motion of the electric motor 110, the ripple of the motor current through the electric motor 110 is used to determine the present position. In this process, each wave is associated with an angle of rotation as a function of the number of commutator segments of the electric motor 110. In this process, the present position value can be determined by adding or subtracting counted waves of the ripple of the motor current. Upon reaching the rotational position associated with the desired mixed water temperature, the electric motor 110 is stopped by the measurement and control device 350 in that the measurement and control device 350 controls the power switch 360 accordingly.

Before the drive 100 is coupled to a mixing mechanism of the mixer via the coupling 190, the cam ring 130 preferably is moved automatically to a normalizing position, with the cam 131 actuating the switch 120 in the normalizing position. The normalizing position can also be referred to as a reference position in this context, since the position value ascertained in this position corresponds to the actual position. A difference between the ascertained position value and the reference position is evaluated or erased when the switch 120 is actuated to ascertain a deviation. In this process, the cam 131 can be distinguished from the cam 132 by the different widths of the cams. To this end, the measurement and control device 350 controls a passage of the cam and ascertains the width of the cam 131, 132 on the basis of the duration of the actuation of the switch 130 or a counted number of waves of the ripple. The circuit 300 is connected to the switch 120 through the cables 320 for this purpose. For example, the duration of actuation of the switch 120 or the counted number of waves of the ripple during the actuation of the switch 120 is compared to a threshold value. Thereafter, the measurement and control device 350 moves the drive 100 to the rotational position of the narrow cam 131 as the reference position.

The mixing mechanism is now adjusted by setting the position of a thermostat for the associated mixing temperature—for example 38° C.—by means of measurement of the mixing temperature. When the cam 131 passes over this rotational position again, it generates a switching pulse of characteristic duration, which is associated with the corresponding mixing temperature, by actuating the switch 120.

A current position value of the rotational position ascertained from the ripple is usually subject to errors, and thus deviates from the actual rotational position. Errors here can be created by waves that occur twice or are absent, for example. Another error source arises during starting and stopping of the electric motor 110, with a number of waves of the ripple not being counted during starting and stopping. The error thus generally increases with the number of displacements.

The circuit 300 from FIG. 1 is designed and configured to associate the rotational position ascertained from the ripple of the motor current with the predefined mixed water temperature using the characteristic signal of the switch 120. Upon detection of the cam 131 from the actuation of the switch 120, the actual rotational position is known, so that a current position value can be associated with the actual rotational position. For example, the current position value is overwritten by a permanently stored, predefined value. This can also be referred to as normalization.

When the wider cam 132 passes over the switch 120, it likewise generates a characteristic signal of the switch 120, which causes a limitation of the actuation distance. To this end, the measurement and control device 350 detects the passage of the wide cam 132 based on the duration of the actuation of the switch 120, and stops the electric motor 110 as a function of the signal that is characteristic for the limitation of the actuation distance. This achieves the advantage that the mechanism of the mixing valve need not be moved to a mechanical limit (stop), which could lead to damage to the mechanically commutated electric motor 110 or to the transmission.

Figure 2:
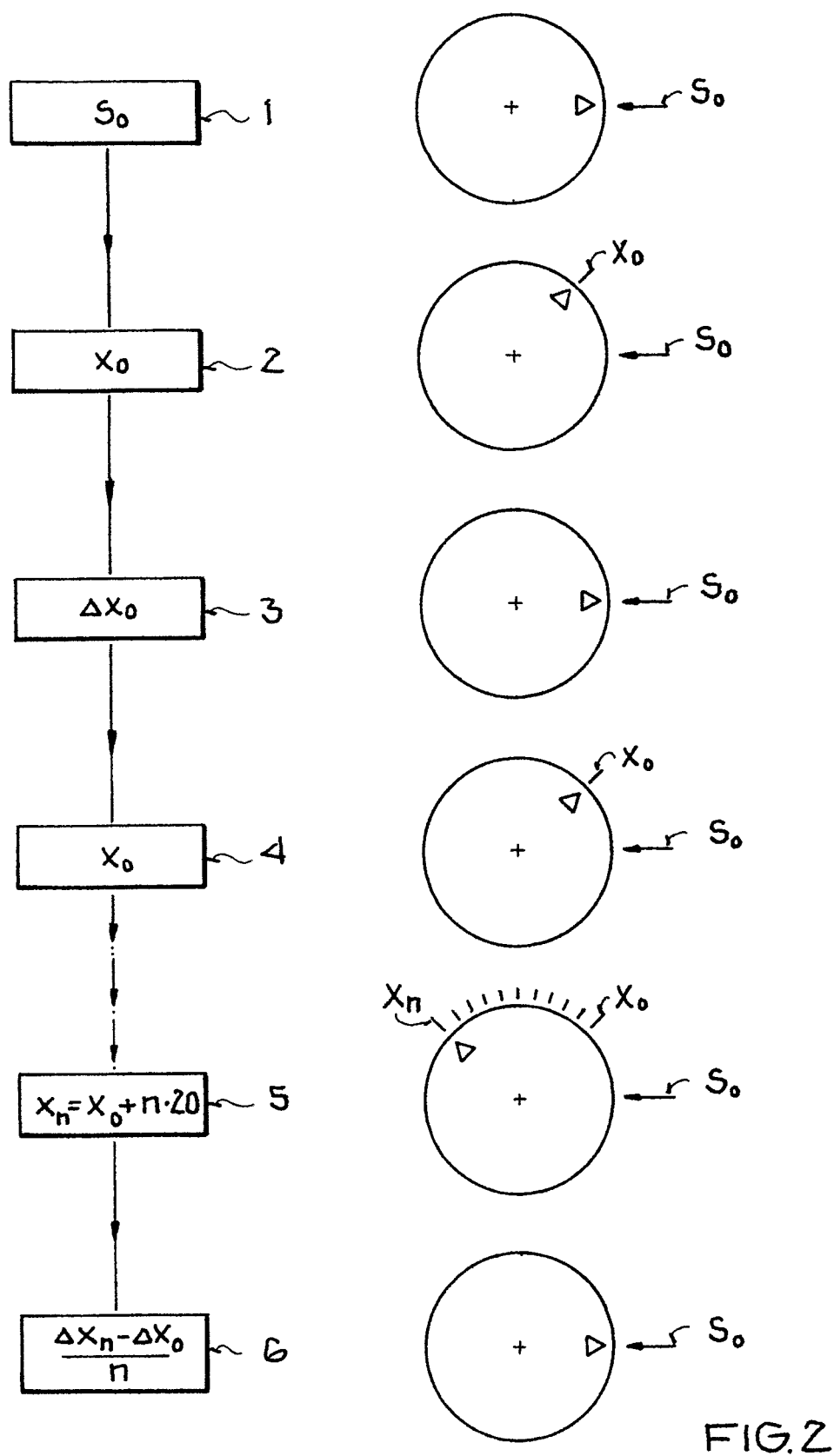
FIG. 2 shows a schematic sequence diagram of a method.

FIG. 2 shows an exemplary embodiment of a sequence diagram of a method. In step 1, the reference position s0 is ascertained using a position sensor signal. In step 2 the drive is moved to the position X0, for example with the position value 100. In step 3, the drive is moved back to the position s0. During the return travel, the waves of the ripple of the motor current are counted. An error is generated by the stopping in the position X0 and the subsequent starting of the displacement in the opposite direction. Consequently, the number of waves counted during the return travel to the reference position s0 deviates from 100. The difference is stored as the deviation ΔX0.

In step 4, the drive is moved to the position x0 again.

Up until method step 5, the drive is successively moved n times in the same direction of displacement from the position X0 to the position Xn. For each of these displacements, the mechanically commutated electric motor 110 starts and stops. In the exemplary embodiment from FIG. 2, the end position of the n displacements is:

$$Xn = Xo + n*20 \qquad (1)$$

In step 6, the drive is moved back from the position Xn to the reference position s0 without an intermediate stop. In this process, the waves of the ripple of the mechanically commutated electric motor 110 are counted. The position value for the position Xn is subtracted from the number of waves counted, so that the total deviation ΔXn is obtained. The deviation ΔX0 for the position X0 is subtracted from the total deviation ΔXn, and the difference is divided by the count n. By this means, the correction value K is calculated as:

$$K=(\Delta Xn-\Delta Xo)/n \qquad (2)$$

The correction value K is an average of the deviations of the n displacements. The correction value K is stored, and in normal operation is read from the memory as needed. The correction value K is added to the current position as an offset when starting the electric motor 110, for example.

Figure 3:
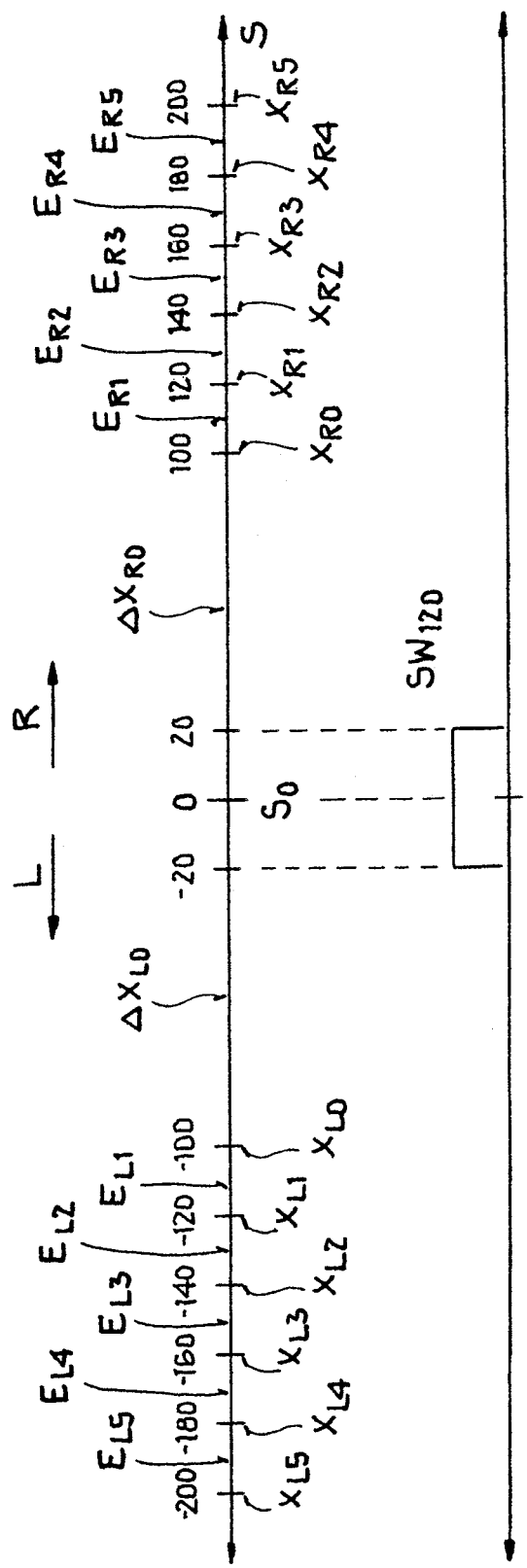
FIG. 3 shows a schematic diagram.

A diagram with position values ascertained from the ripple is shown schematically on a line in FIG. 3. For example, if the switch 120 is designed as a normally open switch, the signal SW120 is generated by the switch. During a right-handed rotation in the direction of displacement R, the switch 120 produces a switching edge at the position value −20. During a left-handed rotation in the direction of displacement L, the switch 120 produces a switching edge at the position value 20. A reference position s0 with the position value 0 is defined as centered between the two position values −20, 20 of the switching edges.

In the method, correction values for an error characteristic of the electric motor are to be determined. In this context, the error characteristic exhibits errors in a position determination that occur during stopping and starting of the electric motor. In this process, a correction value is determined for a right-handed rotation in the direction of displacement R and a correction value is determined for a left-handed rotation in the direction of displacement L. First, the drive is moved to the reference position s0 which can be sensed by means of the position sensor 120. A stop at the reference position s0 is not necessary here, so that the drive 100 is moved starting from an arbitrary negative position value to the reference position s0 and onward to the position XR0 with the position value 100, for example.

During travel back from the position XR0 to the reference position s0, a number of waves of the ripple is counted. During travel back and forth to the position XR1, the deviation ΔXR0 arises because of the stopping and starting at the position XR1.

Thereafter, starting from the reference position s0, the drive 100 is again moved to the position XR0 and then to multiple positions XR1, XR2, XR3, XR4, XR5 at different distances (120, 140, 160, 180, 200) from the reference position s0. The number n in equation (2) is five in the exemplary embodiment from FIG. 3. At each position XR0, XR1, XR2, XR3, XR4, XR5, the electric motor 110 is stopped. In this process, because of the stopping and starting, a deviation ER1, ER2, ER3, ER4, ER5 arises in each case between the positions XR0, XR1, XR2, XR3, XR4, XR5.

During travel back from the position XR5 to the reference position s0, a number of waves of the ripple of the motor current is counted. The counted number of waves deviates from the total of the controlled travel distances between s0, XR0, XR1, XR2, XR3, XR4, and XR5, thus is different from the position value 200.

In order to determine position deviations, the number of waves for returning from the position XR0 to the reference position s0 is subtracted from the number of counted waves. In addition, the position difference 100 between the position XR0 and the position XR5 is subtracted from the number of counted waves. What remains is the sum of the position deviation ER1+ER2+ER3+ER4+ER5.

A correction value for the right-handed rotation in the direction of displacement R is ascertained from the position deviations that have been determined in that the sum of the position deviation ER1+ER2+ER3+ER4+ER5 is divided by a number of displacements with starting and stopping (corresponding to five displacements, n=5, in the exemplary embodiment in FIG. 3) in order to obtain an average value of the deviations as the correction value for a displacement. This calculated correction value for the right-handed rotation is stored in a memory of the measurement and control device 350. During subsequent displacements in the direction of displacement R of the right-handed rotation, the current position at start is modified through subtraction or addition of the correction value as an offset value.

An additional correction value for the left-handed rotation in the direction of displacement L is determined accordingly. Accordingly, travel is first undertaken to the actuation position XL0 with the position value −100 and back to the reference position, and the deviation ΔXL0 is determined. Subsequently, the mutually equidistant positions XL1, XL2, XL3, XL4, XL5 are traveled to in sequence, with one stop and one start in each case. During this process, the deviations EL1, EL2, EL3, EL4, and EL5 are generated by the stopping and starting. By dividing the sum of these deviations EL1+EL2+EL3+EL4+EL5 by their total number of five, an average value of the deviations is calculated as the correction value for left-handed rotation. This calculated correction value for left-handed rotation is stored in the memory of the measurement and control device 350. During subsequent displacements in the direction of displacement L of left-handed rotation, the current position at start is modified through subtraction or addition of the correction value as an offset value.

The invention is not limited to the embodiment variations from FIGS. 1 through 3. For example, it is possible to use a different transmitter, for instance a magnetic (magnetized or magnetically conductive) disk and a magnetic sensor (Hall sensor, inductive proximity switch). It is also possible to provide a different number of displacements of equal displacement length. It is likewise possible to provide a plurality of reference positions, wherein a determination of correction values takes place through measuring errors between two reference positions. In this case, the determination of just one single position deviation could also suffice. The transmitter can also be designed as an incremental transmitter, at least over one part of the displacement path.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a drive with a mechanically commutated electric motor, the method comprising:
   determining a rotational position of the drive by a circuit from a ripple of a motor current of the electric motor;
   determining at least one correction value for an error characteristic of the electric motor;
   moving the drive to a reference position that is sensed via a position sensor;
   moving the drive, starting from the reference position, into multiple positions at distances from the reference position;
   determining at least one position deviation by the circuit;

determining the correction value from the position deviation that has been determined; and storing the correction value.

2. The method according to claim 1, wherein the drive is moved in both directions of displacement starting from the reference position in order to determine at least two correction values.

3. The method according to claim 1, wherein the electric motor is driven by the circuit for a number of waves of the ripple of the motor current in order to move the drive to multiple positions at distances from the reference position.

4. The method according to claim 3, wherein several of the positions at distances from the reference position are arranged at a constant distance from one another.

5. The method according to claim 1, wherein the electric motor is stopped by the circuit at each of the positions at distances from the reference position in order to determine the correction values.

6. The method according to claim 1, wherein the correction value is calculated by averaging position deviations.

7. The method according to claim 1, wherein the method controls a mixed water temperature of a thermostatically regulated mixing valve, wherein a thermostat of a mixing valve for cold water and hot water is positioned by the electric motor of the drive and the mixed water temperature is controlled based on the rotational position that has been determined.

8. The method according to claim 1, wherein the rotational position of the drive is ascertained by adding a number of detected waves of the ripple to, or subtracting the number of detected waves of the ripple from, a current rotational position.

9. A device comprising:

a drive having a mechanically commutated electric motor; and a circuit configured to control the electric motor and configured to ascertain a rotational position of the drive from a ripple of a motor current, wherein the drive has a position sensor connected to the circuit and the circuit being configured to move the drive to a reference position that can be sensed by the position sensor by controlling the electric motor, wherein the circuit is configured to move the drive to multiple positions at distances from the reference position, starting from the reference position, and configured to ascertain at least one position deviation, and wherein the circuit has a memory and is configured to determine and store in the memory at least one correction value for an error characteristic of the electric motor from the ascertained position deviations.

10. The device according to claim 9, further comprising a mixing valve for cold and hot water with thermostatic regulation of the mixed water temperature, wherein the mixing valve has a thermostat that is adapted to be mechanically coupled to the drive, and wherein the circuit is configured to control the mixed water temperature based on the ascertained rotational position.

11. The device according to claim 9, wherein the circuit ascertains the rotational position of the drive by adding a number of detected waves of the ripple to, or subtracting the number of detected waves of the ripple from, a current rotational position.

* * * * *